March 23, 1926.

E. B. DAVENPORT

DISPENSING MACHINE

Filed Oct. 20, 1923

INVENTOR
Edwin B. Davenport
BY
M. C. Frank
ATTORNEY

March 23, 1926.  
E. B. DAVENPORT  
DISPENSING MACHINE  
Filed Oct. 20, 1923  
1,577,695  
2 Sheets-Sheet 2

INVENTOR  
*Edwin B. Davenport*  
BY *M. C. Frank*  
ATTORNEY

Patented Mar. 23, 1926.

1,577,695

UNITED STATES PATENT OFFICE.

EDWIN B. DAVENPORT, OF ROSS, CALIFORNIA.

DISPENSING MACHINE.

Application filed October 20, 1923. Serial No. 669,678.

*To all whom it may concern:*

Be it known that I, EDWIN B. DAVENPORT, a citizen of the United States, residing at Ross, in the county of Marin and State of California, have invented certain new and useful Improvements in Dispensing Machines, of which the following is a specification.

My invention relates to dispensing machines, and more particularly to portable dispensers operated by hand for the delivery of measured portions of semifluid substances, such as grease, heavy oils or the like to points desired, such for example, as to the various receptacles for lubrication about an automobile.

The invention broadly consists of a dispenser of the above character, having a metal receptacle mounted upon wheels or castors, a rotary pump for submersion in the substance therein, a measuring cylinder, an accounting device operably connected with the measuring cylinder, and a circulatory inlet and outlet system to and from said measuring cylinder by the way of a controlling valve. The dispenser is adapted to be operated manually to force the semifluid material therein into the cylinder, and to measure and deliver from the latter a predetermined quantity upon one cycle of the plunger in said measuring cylinder.

This invention is designed primarily for use in garages and shops, to dispense grease in a convenient, clean, accurate and economic manner, as compared with the most common present practice, to-wit: scooping the grease from a drum with a wooden paddle or the like and delivering it to buckets or cups as the case may be. The latter is a very unsatisfactory and wasteful method, and it is my desire to eliminate this practice by the use of my improved machine.

Grease can be purchased in drums or containers of definite amounts, and my present machine is designed to receive the ordinary one-hundred pound grease package whose drum is constructed of very thin material and which may be discarded when emptied. The said drum is provided with an opening in one end thereof, and the diameter of the drum is less than that of my receptacle and is adapted to fit therein in an upright position. The rotary pump of my device is inserted into the grease and is hereinafter more fully described.

Therefore, among the objects of my invention is the production of a device of the character described adapted to be filled with grease or the like in bulk, or to receive a purchased drum of grease.

Another object is to construct a device of the above nature having the pumping and measuring apparatus operative simultaneously.

Another object is to construct a dispenser that may be readily moved from one part of the garage to the other, to directly supply machines with grease or the like without the necessity of measuring it out as heretofore done.

Another object is to combine a pump, measuring apparatus and an accounting device as a unit, and attach the said unit to the cover of my receptacle in such a manner that the cover and unit may be easily removed when it is desired to refill or to place a full drum of grease in the receptacle.

Another object is to construct a device that will accurately measure and dispense grease or any other semifluid that can be forced through it.

A further object is to provide a dispenser with an adjustable measuring device for determining the accurate measure of semifluids having different specific gravities.

And a still further object is a provision in the operating gear of the device, permitting the turning of the pump in one direction only, otherwise inaccurate measure may result.

In addition to the above broader features of the invention, there are certain details of design, whereby compactness, durability of structure, and positiveness and ease of operation are attained, and which details are shown on the accompanying two sheets of drawings illustrating the present embodiment of my invention.

Figure 1 of the said drawings is a side elevation of my portable dispenser.

Figure 2:
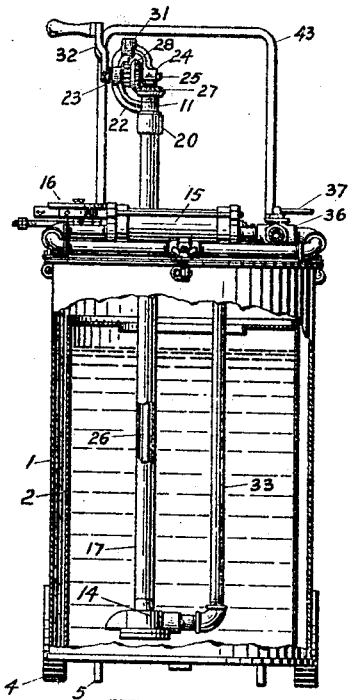
Fig. 2 is also a side elevation but taken at right angles to that of Fig. 1. Part of the receptacle is broken away to show the interior thereof to better advantage, certain parts of which are shown in section.

Referring to the drawings and the figures thereof: The numeral 1 designates a receptacle, preferably cylindrical in shape and constructed of sheet metal, and of sufficient size to receive a drum of grease 2 or other semifluid material in its original package. In Fig. 2 and to the scale shown, the drum 2 is an ordinary cylindrical one containing one-hundred pounds of grease. The receptacle 1 is larger in diameter than the drum and extends considerably above it when the latter is in place therein.

An axle 3 is riveted or otherwise secured to the lower region of the receptacle 1, and is provided with a pair of truck wheels 4. Rigid lugs or supports 5 are secured to the under side of the receptacle 1 to support the front end thereof when in an upright position. A foot bracket 7 is attached to the receptacle 1 over the axle 3 midway between the wheels 4, Fig. 4, and extends outwardly in a position to be engaged by the foot of the operator to aid in tilting the receptacle when it is desired to wheel it about.

The upper end of the receptacle 1 is provided with an annular flange 8 for the reception and support of an annular cover-plate 9. Said cover is provided with diametrically opposed slots 10 which register with like slots formed in the flange 8. Bolts 12 are pivotally secured to the upper end of the receptacle 1 in a position to engage the slots 10, and wing-nuts 13 are provided on the bolts to clamp the cover 9 in place upon the flange 8. A gasket may be placed between the flange and cover, if desired, to assure a sealed joint thereat. The cover 9 supports a rotary pump 14 and means for manually operating the same, and also a measuring cylinder 15 provided with an accounting device 16.

The pump 14 consists of a small force pump of the rotary type as commonly used for semi-liquids, and is attached to the lower end of a vertical stand pipe 17. The pump is normally within close proximity to the bottom of the drum. Said stand pipe extends upwardly through the cover 9 and base flange 18 riveted to said cover as at 19, and to which flange the stand pipe is secured by the set-screw 6, Fig. 4. To the upper end of stand pipe 17 is secured a casting 20 by the set screw 21. Said casting has a curved extending member 22 which forms a bearing yoke having horizontal bearings 23 and 24 for the reception of the crank shaft 25 which will be hereinafter more fully described.

The pump-operating shaft 26 is incased in the stand pipe 17 and extends upwardly through the casting 20 as at the neck 11 which forms an upper bearing for the said shaft. The lower end of shaft 26 is connected with the rotor (not shown) of the pump 14. The said stand pipe 17 not only supports the pump and driving gear therefor, but also prevents the contents of the drum from coming in contact with the shaft 26, and thereby eliminates any unnecessary frictional resistance between the pipe and shaft 26.

A bevel gear 27 is secured to the upper end of shaft 26 by the pin 34, (Fig. 7) and is adapted to mesh with a similar bevel gear 28 rigidly mounted upon shaft 25 by the pin 35. A ratchet wheel 29 is cast integral with the bevel gear 28 and is adapted to be engaged by a spring actuated pawl 30 supported in the housing 31 of the member 22. A crank handle 32 is affixed to the outer end of shaft 25 and held against backward movement by the said pawl and rachet mechanism 29 and 30, thereby allowing the crank handle 32 to be manually operated in one direction only to prevent service interruption and erroneous register.

Figure 3:
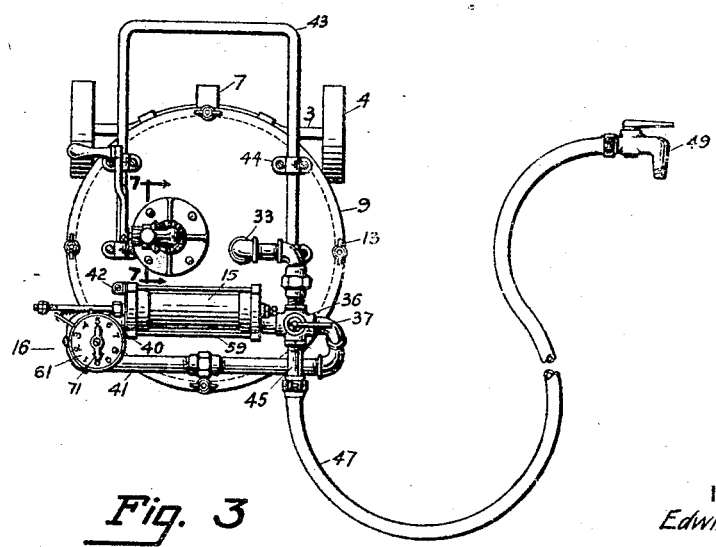
Fig. 3 is a plan of the device and shows as a part thereof a delivery hose which is omitted in the other figures.

The discharge pipe 33, (Fig. 2) is screwed into the outlet of the pump 14, and extends upwardly and parallel with the stand pipe 17 and thru cover 9, and is connected by common pipe fittings to a four-way valve 36. Said valve 36 has a control handle 37 connected to its valve plug, and which is operated as hereinafter set forth. A nipple 38 connects the four-way valve 36 with the end cap 39 of the measuring cylinder 15. A second end cap 40 is secured to the opposite end of cylinder 15 by tie rods 59 (Fig. 3). Bracket 42 secures the cylinder to the cover 9.

A circulatory system denoted in general by 41 connects the cylinder 15 with the four-way valve 36. To the latter valve is also screwed a nipple 45 which extends outwardly therefrom and engages a flexible connection 47, such as a portion of rubber hose or the like, and the outer end of said flexible connection is provided with a dispensing faucet 49 of suitable character.

The measuring cylinder 15 is cylindrical in cross-section and of diameter and length to approximate a chosen volume. A plunger 50, Fig. 4, preferably consisting of two leather cup-shaped sections abut each other and are centrally perforated for the reception of a plunger rod 53. Said plunger rod 53 carries discs 54 and jam-nuts 55 adapted to rigidly bear and hold said sections together. The plunger rod extends outwardly thru a stuffing box 56 formed upon the end cap 40 of the cylinder 15. An adjusting screw 57 is tapped into the opposite end cap 39 and is held in adjustment by the jam-nut 58.

Figure 8:
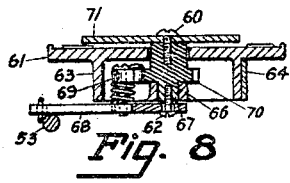
Fig. 8 is a vertical section of the registering mechanism taken upon line 8—8 of Fig. 5.

The accounting mechanism 16 consists of a dial 61, Fig. 3, and a downwardly extending housing 63, shown clearly in Fig. 8. A bracket 64 is secured to the end cap 40 by the tie rods 59, Fig. 5, and extends outwardly from the said cap to receive and have secured thereto the said housing 63 as by screws 65. A web 66 extends across the lower end of the housing and is centrally bored to form a bearing and support for the indicator shaft 67.

An actuating arm 68, Fig. 8, is loosely mounted to the bottom end of indicator shaft 67 by the holding screw 62, and a spring-actuated pawl 69 is pivotally connected with the actuating arm 68 and adapted to engage a ratchet 70 integral with shaft 67. A pawl 46 in the housing 63 permits rotation of ratchet 70 in one direction only. The indicator hand or arrow 71 of the accounting mechanism 16 is fixed integral with the latter shaft by the binding screw 60.

Figure 4:
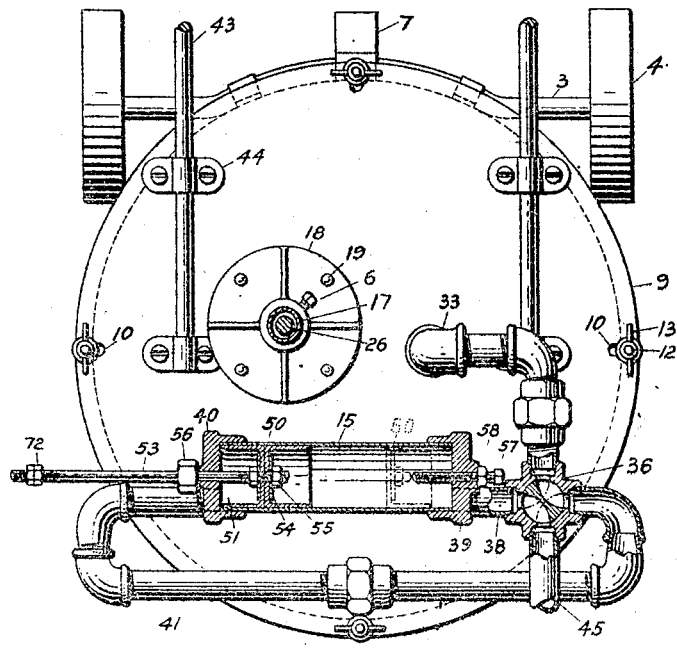
Fig. 4 is an enlarged plan showing the four-way valve and measuring cylinder in sectional detail.

The outer end of plunger rod 53, Fig. 4, is provided with a long thread for adjustment and with jam-nuts 72; the latter are adapted to engage the actuating arm 68 of the accounting mechanism to oscillate the said arm in conjunction with coil spring 73 upon movement of the plunger rod 53. One end of coil spring 73 is connected to the extremity of the arm 68, and its opposite end is fixed to the extremity of the aforesaid bracket 64 as at 74, Figs. 5 and 6.

In use, the operation of my invention is as follows: The cover 9 carrying all the working apparatus of the dispenser is first removed from the receptacle 1 and a drum of grease or other semifluid substance is then placed therein. The cover 9 is replaced, bedding the attached pump 14, stand pipe 17 and discharge pipe 33 in the grease.

Figure 1:
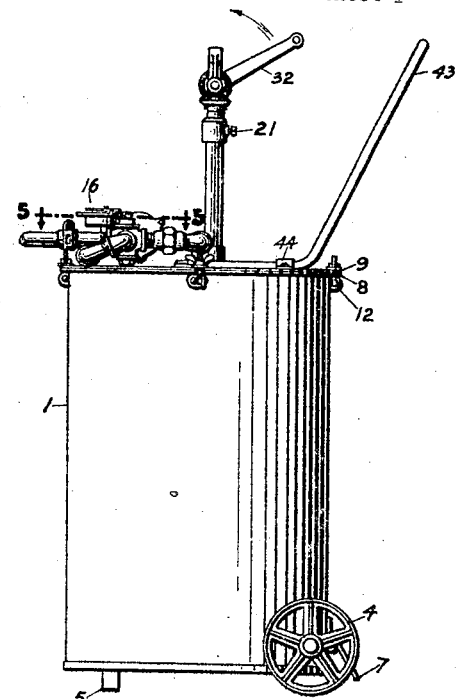

Assuming that the four-way valve 36, Fig. 4, is set at the dot-and-dash position shown, and that the crank handle 32 has been rotated in the direction of the arrow as shown in Fig. 1, the pump 14 will force grease into the measuring cylinder 15 until the plunger 50 has travelled to its limiting position, as from the dot-and-dash position to the position shown in full lines, filling the cylinder, in this instance, with one-half pound of grease. As this position is reached the handle 37 of valve 36 is turned through an arc of ninety degrees, turning the valve to the full-line position shown in Fig. 4, and upon further operation of the handle 32 grease is forcibly continued through the discharge pipe 33 and valve 36 and the circulatory piping 41 into the cylinder and back of plunger as at 51 to force the plunger back against screw 57, thereby completing the full stroke. This operation forces the previous grease in the cylinder 15 out through nipple 38 and the delivery outlet 45 to the flexible connection 47 and valve 49, thereby delivering one pound of grease from the valve 49, of course, assuming that the line is filled with grease up to the valve 49 previous to service dispensation.

Figure 5:
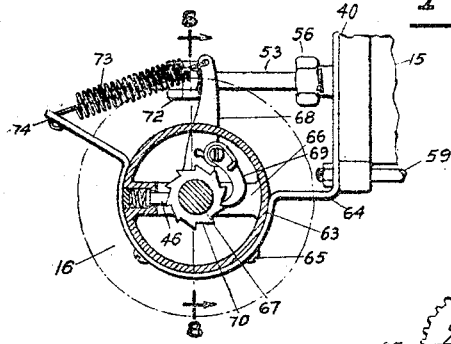
Fig. 5 is an enlarged horizontal sectional detail of the accounting device taken upon the line 5—5 of Fig. 1, just under the indicating dial whose outline is represented by the dot-and-dash lines. This figure shows the plunger rod in operative contact with the accounting mechanism.
Figures 6, 7:
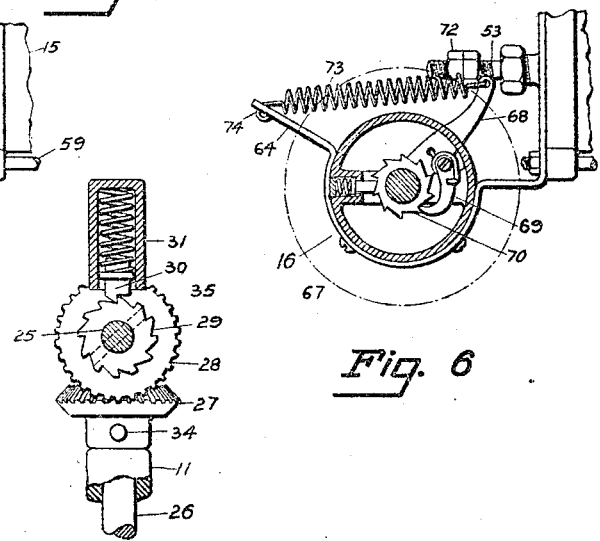
Fig. 6 is a view analogous to Fig. 5 and shows the plunger in limiting engagement with the accounting mechanism.
Fig. 7 is an enlarged sectional detail of the pawl and ratchet mechanism for determining the movement of the pump in one direction and is taken upon the line 7—7 of Fig. 3.

The backward movement of rod 53 and plunger 50 as just recited, contacts and moves the actuating arm 68 to the position shown in Fig. 6, which movement turns shaft 67 and indicator hand 71, which is normally set at zero, one notch or to the figure 1 upon the indicator dial 61, thus visibly indicating that one pound of grease was delivered. A complete cycle, which is a forward and backward movement of the plunger 50 from the adjusting screw 57, measures a pound of grease and delivers it from said cylinder 15 to the outlet valve 49. The actuating arm 68 of the accounting mechanism 16, only records the measure of the number of pounds delivered on the dial 61 by its backward movement as shown in Fig. 6. The pawl 69 is idle upon the forward movement of the arm as shown in Fig. 5.

At the completion of each half-stroke, the four-way valve 36 is turned through ninety degrees as previously explained, to keep a constant discharge flow in action.

After each operation of service delivery to one customer, the indicator hand is manually turned to the right to the zero mark again by the operator and is in position for use for the next customer.

The machine rests in normal position as shown in Fig. 1 upon the supports 5 and wheels 4, and when the dispenser is to be moved, the operator grasps the handle 43 secured to the cover 9 by clips 44, and tilts said machine by placing his foot against the foot bracket 7 which balances the weight of the device upon the wheels.

When all of the grease has been forced from the dispenser the cover 9 is removed and also the empty container, and the receptacle 1 is ready for another loading.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States, is the following:

A dispensing machine for semifluid materials comprising a portable receptacle having a removable cover, a pump within said receptacle, a measuring chamber horizontally mounted upon said cover, a pipe line leading from said pump to said measuring chamber, a piston reciprocating within said measuring chamber, a piston rod carried by said piston and ratchet mechanism carrying indicating means disposed in a plane parallel to said cover and adapted to be operated by said piston rod.

In testimony whereof I affix my signature.

EDWIN B. DAVENPORT.